July 26, 1955
J M. SUMMERS
2,714,032
LATCH FASTENER
Filed Nov. 24, 1954
4 Sheets-Sheet 1
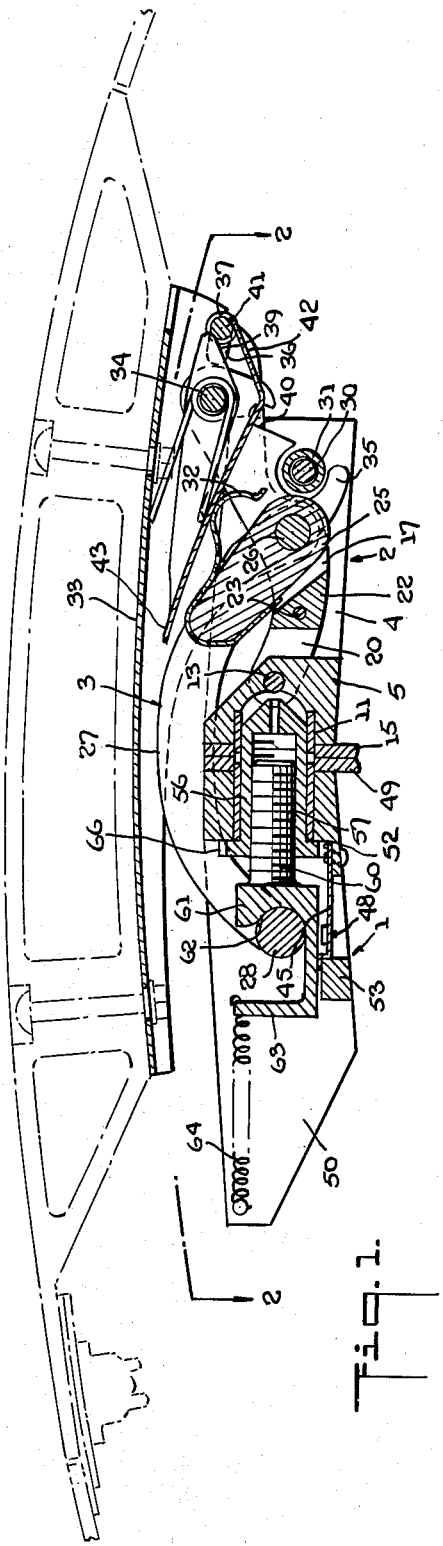
INVENTOR.
J MILLS SUMMERS
BY John P. Chandler
his ATTORNEY July 26, 1955
J M. SUMMERS
2,714,032
LATCH FASTENER
Filed Nov. 24, 1954
4 Sheets-Sheet 2
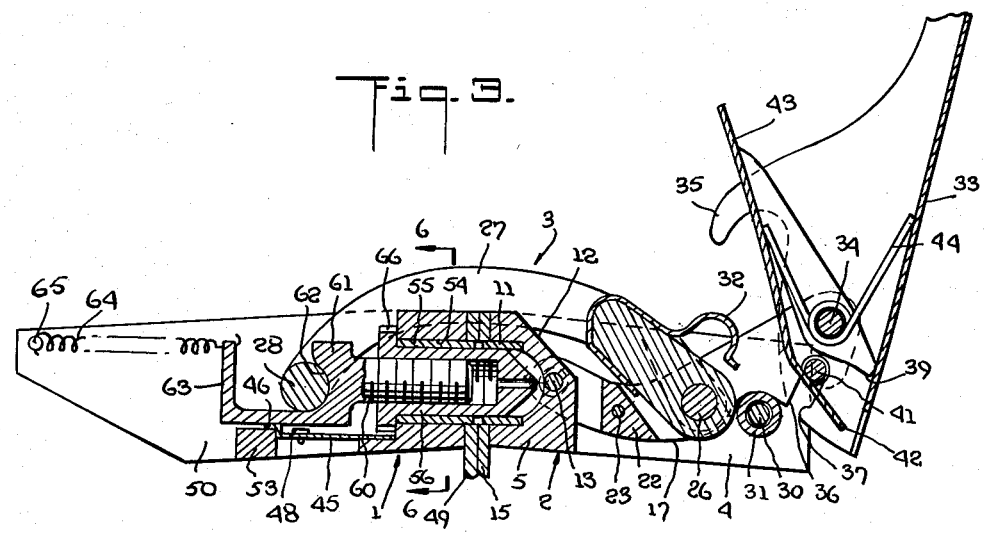
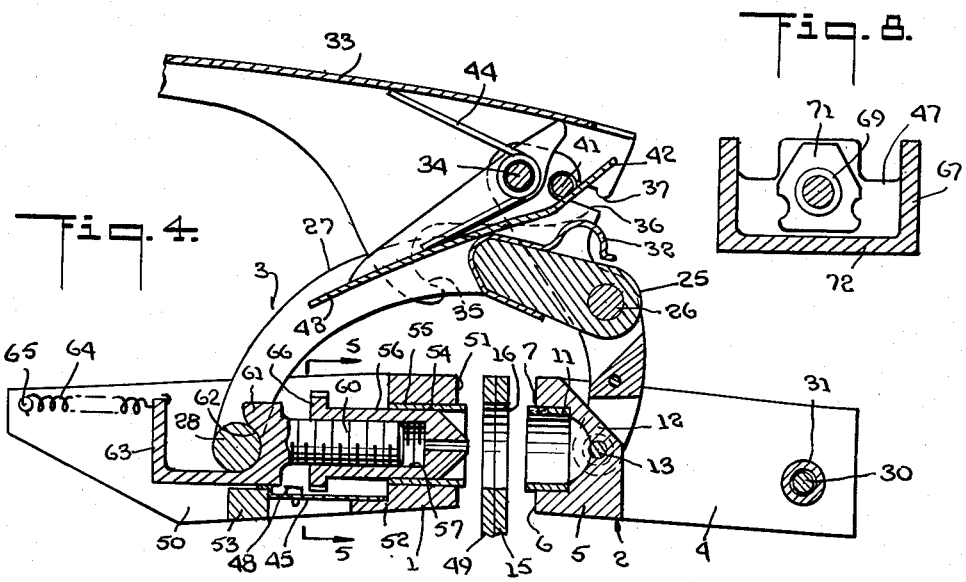
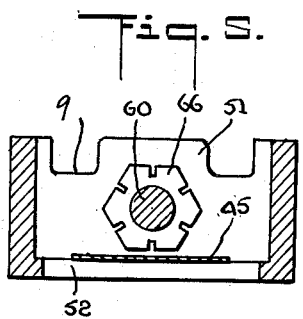
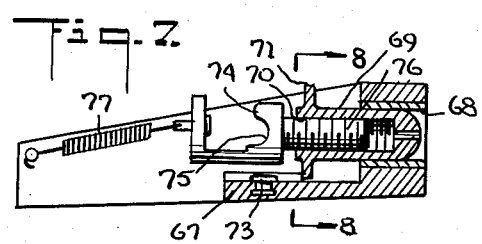
INVENTOR.
J MILLS SUMMERS
BY John P. Chandler
his ATTORNEY July 26, 1955     J M. SUMMERS     2,714,032
LATCH FASTENER
Filed Nov. 24, 1954     4 Sheets-Sheet 3
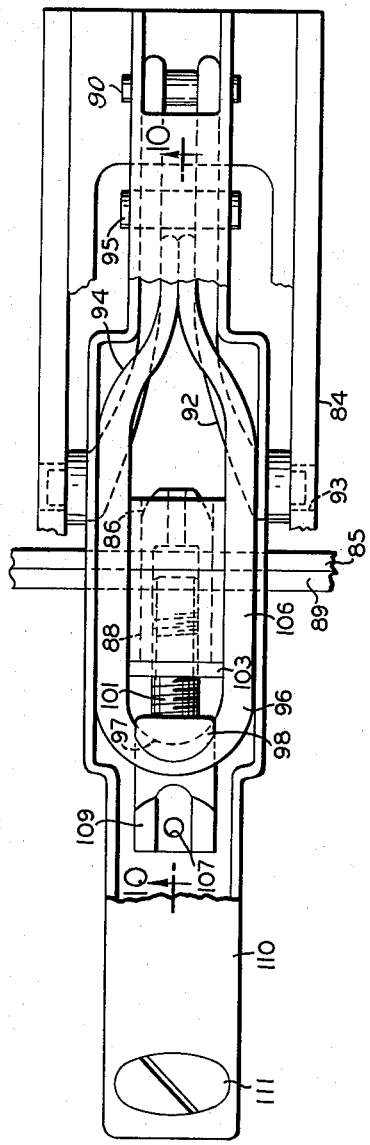
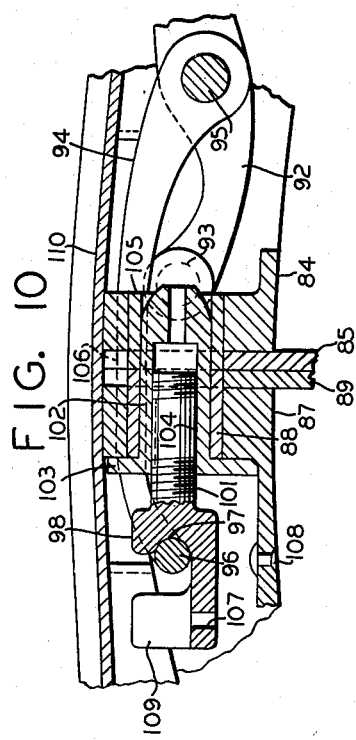
INVENTOR.
J MILLS SUMMERS
BY *John P. Chandler*
*his* ATTORNEY.

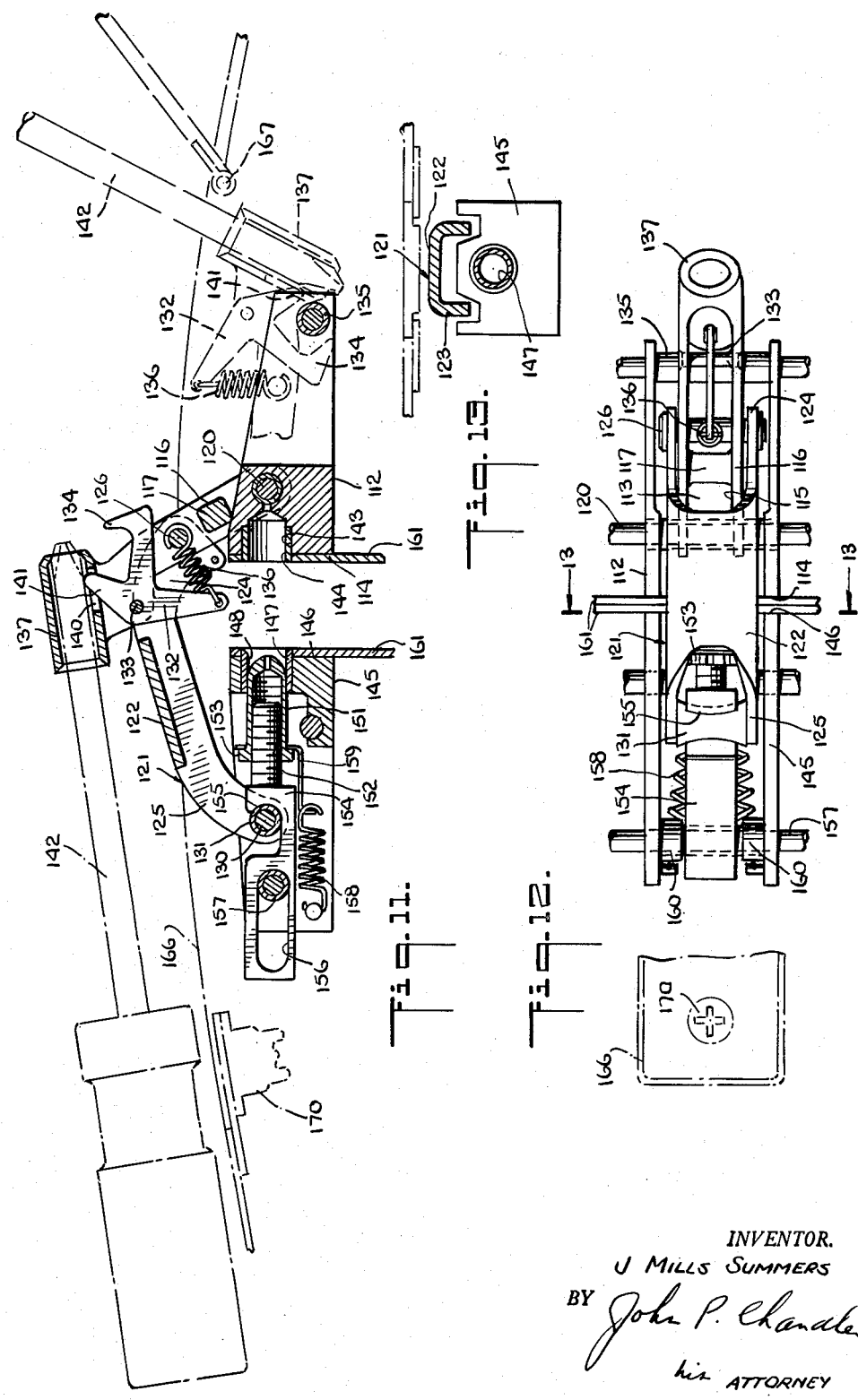

United States Patent Office 2,714,032
Patented July 26, 1955

2,714,032

LATCH FASTENER

J Mills Summers, Englewood, N. J., assignor to Camloc Fastener Corporation, Paramus, N. J., a corporation of New York Application November 24, 1954, Serial No. 471,059

11 Claims. (Cl. 292—247)

This invention relates to new and useful improvements in heavy duty latch fasteners and relates more particularly to a novel fastener having a toggle action for drawing together and securing a plurality of bodies in flush or substantially flush relation and for securing such bodies against shear and tension stresses. The present application constitutes a continuation-in-part and a division of my co-pending application Serial No. 261,233, filed December 12, 1951, now Patent No. 2,695,803, issued November 30, 1954.

An important object of the present invention is to provide a latch fastener designed primarily, although not exclusively, for securing airplane cowlings and closures for access openings in aircraft where accurate performance is highly necessary and wherein the possibility of accidental unlatching must be completely eliminated.

Another object of the invention is to provide a latch fastener which can be fully assembled by the latch manufacturer and thus eliminate piecemeal assembly, which can be adapted to various curvatures of removable panels, and which overcomes excessive friction due to misalignment of the two sections of the fastener.

Still another object of the invention is the provision of a heavy duty latch fastener which is capable of absorbing shear loads in all directions as well as heavy tension loads. The fastener has means for reaching out to engage the mating part where the two bodies are initially beyond usual distances apart prior to latching. A novel shear pin assembly is provided which lies wholly within one of the structures and this shear pin assembly is moved outwardly by a latch element having a considerable measure of leverage and which aligns the parts. This latch element has a toggle action and draws the parts tightly together after which the element is locked against accidental dislodgement.

Yet another object of the invention is to provide an improved draw bolt structure for a latch fastener employing a retractable shear pin wherein the neutral axis of the draw bolt substantially coincides with the shear pin center line when the parts are locked.

A further object of the invention is to provide improved means for adjusting the component parts of the shear pin assembly to provide a desired measure of tightness of the toggle action. The improved shear pin assembly can also be more readily removed and a new one inserted than could the assembly in my earlier application.

In the drawings:

Fig. 1 is a central section taken through a fastener embodying the present invention.

Fig. 2 is a section taken on line 2—2 of Fig. 1 and constituting a plan view of the main body of the latch fastener.

Fig. 3 is a section similar to Fig. 1 but showing handle in open or extended position.

Fig. 4 is an exploded view showing the parts in partially unlocked position.

Fig. 5 is a section taken on line 5—5 of Fig. 4.

Fig. 6 is a section taken on line 6—6 of Fig. 3.

Fig. 7 is a section showing details of a modified shear pin assembly.

Fig. 8 is a section taken on line 8—8 of Fig. 7.

Fig. 9 is a plan view of the modified form of the invention.

Fig. 10 is a broken section taken on line 10—10 of Fig. 9.

Fig. 11 is a central section showing a second modification of the invention.

Fig. 12 is a plan view thereof.

Fig. 13 is a section taken on line 13—13 of Fig. 12.

The latch fastener of the present invention includes two frames 1 and 2, the latter having a draw bolt 3 and the former having a slidable assembly including a detent for receiving the outer end of the draw bolt and a retractable shear pin which is wholly received in frame 1 when the parts are unlocked but which is movable into frame 2 when the latch is in locked position. For convenience in description the frames will be referred to as the draw bolt frame and the shear pin frame.

If the fastener is used on an access opening the shear pin frame is usually attached to the fixed part of the structure and the draw bolt frame to the movable member such as the closure plate.

The draw bolt frame 2 has opposed side walls 4 and an interconnecting base wall 5 at its outer end and formed with a front wall 6 having a central opening 7 and spaced slots 8 which extend downwardly from its upper face for a purpose to be described. This front wall receives in snug fit relation a sleeve 11 and such front wall further has a central rearward extension 12 having a transverse opening which receives a pivot pin 13. The ends of the pivot pin are received in openings 14 in side walls 4 of the frame 2. A shear plate 15 is secured by suitable means (not shown) to the structure or to the frame and has an opening 16 for sleeve 11 (see Fig. 4). In most installations the shear plate 15 will be secured to the structure and sleeve 11 forms a close coupling between the shear pin of frame 1 and the structure with which frame 2 is associated. In other words, shear stresses from the shear pin assembly are transferred to the other structure to which frame 2 is secured rather than to frame 2 itself. The front ends of side walls 4 (Fig. 2) are of increased thickness to form additional support for pivot pin 13.

A draw bolt lever 17 is of bifurcated construction at each end thereof and may be forged or cast in one piece or may be formed from two metal stampings, one of which is shown in elevation at 20 in Fig. 1. These two plates are held in spaced relation by a spacer block 22 and a pin or rivet 23 secures the plates to the block during welding. The two spaced legs forming the inner bifurcated end of the draw bolt lever are mounted on pivot pin 13. The outer end of the draw bolt 3 is essentially a bail hook and functions like a link in a chain. It is formed as a loop and its inner end 25 is pivotally mounted between legs 20 of the draw bolt lever by means of a pivot pin 26.

At its outer end the draw bolt has a transverse portion or crosspiece 28 and between the crosspiece and pivot 26 the bolt has a central portion 27 which may lie above pivot 26 and crosspiece 28, depending upon the depth of the slots in the frames in which this portion is received. Adjacent their rear ends side walls 4 of the draw bolt frame form a support for a cross pin 30 which carries an anti-compression spacer or sleeve 31 for side walls 4. A spring clip 32 is secured to the draw bolt and when the parts are in unlocked position this spring clip engages spacer sleeve 31 to retain the draw bolt and the draw bolt lever free and clear of the parting seem between the two frames and their shear plates.

This allows for a clear approach for the draw bolt when the parts are moved to locking position.

The length of the draw bolt lever is relatively short and in order to increase its effective length to draw the parts to locked position an assisting lever or handle 33 is mounted at the outer end of the draw bolt lever by means of pivot pin 34. Handle 33 is preferably formed of sheet metal and is of channeled shape. The opposed walls forming the channel are provided with a hook element 35 which, when the parts are in locked position, underlies spacer sleeve 31 (Fig. 1) and thus so long as the handle is maintained in closed position the draw bolt lever cannot rise and cause the parts to become unlocked.

The lever or handle 33 is normally free to rotate relative to the draw bolt lever but when relative rotation between the levers is restrained the handle 33 acts as a crowbar or stiff-legged extension to facilitate the toggle action.

The following means are provided for locking the handle relative to the draw bolt lever and for releasing such locking action when the parts are to be moved to locked position. The inner end of the channeled handle is formed with aligned slots 36 having ears 37 at their outer ends. The outer end of the draw bolt lever is also formed with aligned slots 40. A locking pin 41 is disposed transversely in aligned slots 36 in floating relation and when the parts are in locked position the pin is disposed substantially at the outer ends of slots 36 and ears 37 limit outward movement of this pin. This pin is urged inwardly within slots 36 by a flat spring 42 formed as a part of a channel shaped lever or trigger 43 also carried on pivot pin 34. The inward movement is restrained by cam surfaces 39 on the trigger. As handle 33 is moved outwardly from the position of Fig. 1 to the position of Fig. 3 flat spring 42 commences to move locking pin 41 inwardly in aligned slots 36 and after a short inward travel, further rotation of the handle causes cam surfaces 39 to push the pin outwardly and when handle 33 reaches the ultimate outward position of Fig. 3 transverse slots 36 in the handle and transverse slots 40 in the draw bolt lever become aligned and thus the locking pin moves into slots 40, thus effecting a locking action between handle 33 and the draw bolt lever. To release this locking connection between the two members trigger 43 is depressed and cam surfaces 39 at the inner end of lever 43 gradually cam locking pin 41 outwardly in slots 36 and as soon as the pin has passed completely out of slots 40 the lever is free to be moved inwardly to the locking position of Fig. 1. A spring 44 resists inward movement of trigger 43.

The shear pin assembly in frame 1 will now be described. A shear plate 49 is associated with frame 1 and may be secured to the structure. This frame is similarly formed with opposed side walls 50, an interconnecting front wall 51, a front base wall 52 and a rear base wall 53. Interconnecting front wall 51 has a pair of spaced slots 9 (Fig. 6) aligned with slots 8 in the other frame, and an opening 54 which receives a bushing or sleeve 55 within which shear pin 56 slides. The shear pin has a threaded bore 57 which receives a threaded pin 60 which is integral with a detent member 61 having a detent 62 which receives the cross piece 28 of the loop of the draw bolt. The detent member has a tail piece 63 and springs 64 are secured at one end thereof to the tail piece and at the other end to pins 65 carried at the inner ends of side walls 50 of the frame. Tail piece 63 acts as an abutment against which cross piece 28 may operate if the springs fail to retract the assembly. The shear pin assembly, including the detent member, thus may slide longitudinally of the frame and in order to adjust the parts to obtain a tight toggle, the shear pin has a noncircular nut-like flange 66 at its inner end, the flat edges of the flange having slots to receive a tool for rotating the flange. This flange is shown as being of hexagonal shape and when the shear pin assembly is in an extended position, when the parts are locked as shown in Fig. 1, rotation of the flange is prevented by the proximity of one of its flat sides to forward base wall 52 of the frame.

It is also desirable to prevent casual rotation of the flange when it is in its rearward position (Fig. 4) and for this purpose a flat spring 45 is secured by a rivet to the upper face of lower base wall 52. At its rear end the spring has an upward, rearward extension 46 which rests on the upper face of base wall 53. A headed pin 48 is carried by the spring in the position shown. When the shear pin is free to travel rearwardly under the influence of springs 64, flange 66 encounters pin 48 which acts as a stop. When, however, it is necessary to insert a new shear pin assembly the spring is depressed further and this permits the flange to ride clear of the stop pin. When the flange is rotated it merely forces spring 45 downwardly and this spring returns to its normal position of Fig. 5 when any one of the flat sides of the flange becomes parallel to the spring. If desired, this spring may have tabs which normally lie above the upper face of wall 53, and lower tabs which underlie this wall, thus permitting the spring to have greater up and down movement. In this arrangement the pin 48 acts as a stop to flange 66 and when the free rear end of the spring is depressed it permits the flange to move free of the pin. It will be noted that slots 8 are formed in front wall 51 of frame 1 to receive the draw bolt and similar slots 9 are aligned therewith in frame 2.

Fig. 4 shows the position of the parts when the fastener is about to be locked. The draw bolt is moved forwardly and downwardly, thus seating its cross piece in detent 62. The handle is now moved rearwardly, causing the shear pin to move into the other frame and to draw the parts together. As soon as the draw bolt has passed below center the parts are in fully locked position and the trigger is now depressed to allow both the trigger and the handle to be folded and tucked away into the compact position of Fig. 1.

The lower portions of the two legs of the draw bolt forming portion 27 are positioned in slots 8 and 9 in frames 2 and 1 when the parts are locked. These slots could be made sufficiently deep to receive the entire cross-sectional area of the legs and also to allow the draw bolt to be substantially straight. It will be noted in Fig. 6 that the legs are shown as being spaced slightly from the bottoms of the slots. When, however, any excess tension stresses are placed on the fastener the draw bolt, because of its C shape, tends to deflect and the legs directly seat themselves in the bottom walls of the slots, preventing further deflection.

Figs. 7 and 8 show a slightly modified shear pin assembly. In this case the frame 67 has sleeve 68 for shear pin 69 and a slot 47 for the draw bolt. The shear pin has a threaded opening 70 and a plate 71 which substantially engages lower wall 72 of the frame to prevent rotation of the shear pin. A stop 73 limits rearward travel of the shear pin. The block 74 is formed with a detent 75 for the draw bolt and a threaded pin 76 is carried by the block, which is received within threaded opening 70 in the shear pin. Springs 77 draw the shear pin assembly rearwardly. If the toggle action is not sufficiently tight the pin 76 is unscrewed. These springs, only one of which is shown in Fig. 7, tend to restrain rotation of the block.

In the modified form of the invention shown in Figs. 9 and 10 somewhat different type of draw bolt lever is provided. The draw bolt frame 84 has a shear plate 85 and a bushing 86 extends through aligned openings in the frame and in the shear plate. Frame 87 similarly has a bushing 88 extending through the opening in the shear plate 89. The primary or draw bolt lever is formed with two legs 92 formed with trunnions which are received in aligned openings 93 in frame 84 and the outer ends of the legs are joined by a pin 90. This connection is sufficiently resilient to permit the inner ends of the legs to be manually moved towards each other a sufficient distance to enable the trunnions to enter the bearing openings. The draw bolt 94 is mounted between the legs on pivot pin 95.

The draw bolt cross piece 96 at its outer or free end is received within detent 97 in a block 98 which is formed at the outer end of a screw 101. This screw is mounted in a shear pin 102 having a flange 103 which preferably is of non-circular construction and which is mounted in the sliding assembly. The shear pin has a threaded opening 104 to receive the screw and adjustment of the toggle action is effected by rotating the screw to an adjusted fixed position relative to the shear pin.

A pin 108 limits rearward travel of flange 103 and one end of a spring (not shown) passes through an opening 107 in the outer terminal section of block 98. Tail piece 109 serves as an abutment against which cross pin 96 may act if the block carrying the shear pin fails to retract under the influence of the spring.

It will be noted that in this form of the invention the central section of the draw bolt, when viewed from the side, is less offset relative to cross piece 96 and draw bolt pivot 95 than in the first embodiment.

In the final form of the invention shown in Figs. 11, 12, and 13, the draw bolt frame 112 has a central lug 113 extending rearwardly from its forward face 114 and the frame is further formed with spaced vertical slots 115 on each side of the lug, which slots receive the spaced legs 116 which form a primary lever, the legs being maintained rigidly in spaced relation by a web 117. The lever is pivoted in slots 115 by a pin 120.

A draw bolt 121 is of channeled construction and has a connecting web 122 and side walls 123 and opposed terminals or legs 124 and 125. Legs 124 are pivoted to the primary lever by a pin 126 and legs 125 carry a pin 130 supporting a fitting 131 which is spool shaped. The spool, pin and legs are brazed together to form an integral assembly.

A bell-crank type of lever 132 forms an auxiliary lock and is pivoted at 133 between the outer ends of the draw bolt lever and has a hook-shaped portion 134 which, when the parts are locked, engages under a cross pin 135 carried by the frame. A spring 136 urges the hook to pin-engaging position. A socket 137 is rigidly supported by the draw bolt lever and it has a vertical slot 140 which receives a tail-piece 141 of lever 132. When the parts are locked they occupy the position shown in Fig. 11 and the draw bolt and the primary lever are in a below center position and the latter cannot rise because hook 134 engages pin 135. When, however, a manipulating tool, such as a screw driver 142, is inserted into the socket (Fig. 11) the hook is displaced and the primary lever is free to open. The forward face 114 of the frame is provided with a central opening 143 with a bushing 144 for the draw bolt.

The shear pin frame 145 has a forward face 146 having an opening 147 aligned with opening 143 and a bushing 148. The shear pin assembly includes a shear pin 151 tapered at its forward end having a threaded opening 152 at its rear end and a non-circular flange 153. The shear pin assembly further includes a bolt 154 having a recess 155 shaped to fit spool 131 and a forward threaded section received in threaded opening 152 in the shear pin. The bolt further has an elongated transverse slot 156 which receives a pin 157 carried by the frame. The shear pin assembly is urged rearwardly by two springs 158 which are connected with an angle bracket 159 having an opening in its vertical portion to receive the shear pin. Spacer bushings 160 retain the bolt in central position. The front walls of the two frames are formed with shear plates 161, which may be secured to the frames or to the structure. When the two frames are separated and it is desired to move the parts into latched position the screw driver or the tool is inserted in the socket and the draw bolt is moved forwardly until spool 131 is engaged within slot 155. The tool is then drawn rearwardly, which causes the tapered shear pin to move into the draw bolt frame and during this movement any misalignment is corrected. As soon as the pivotal element 126 passes below center the driver is withdrawn and the hook-shaped element 134 drops into position under pin 135 due to the action of spring 136. Springs 158 draw the shear pin assembly rearwardly only when the draw hook is disengaged. The purpose of this is to keep the shear pin back of the seam in the case of an angular approach of the components being fastened. In order to close the opening a cover 166, hinged at 167, is now moved to the dotted line position of Fig. 11 and the outer end locked by a quarter turn fastener 170.

It will be seen from the foregoing that pin 157 and slot 158 at the rear end of bolt 154 keeps the center line of the shear pin assembly stable at all times and avoids any possibility of cocking or jambing in case the shear pin encounters friction due to misalignment.

Adjustment of the parts is effected in this case by rotating the shear pin rather than its bolt. This final form of shear pin assembly may, of course, be used in connection with the first form of the invention.

What I claim is:

1. A latch fastener for drawing two bodies together and for securing them in rigid relationship against shear and tension loads, said fastener comprising two assembly units, one secured to each of said bodies, each assembly unit including a frame, a draw bolt pivotally mounted in one frame and constituting a bail-type hook with a loop at its outer end, the frame having aligned slots on their upper faces to receive the intermediate portion of the draw bolt when the fastener is locked, a longitudinally adjustable shear pin assembly slidably mounted in the second frame and comprising a shear pin, a bolt having a transverse detent to receive the loop and having a forward threaded extension which is received by the shear pin, a draw bolt lever pivoted at one end in the first frame, the draw bolt pivot connecting the draw bolt with the lever intermediate its ends, said lever being movable to a below center position with a toggle action to lock the fastener with the shear pin in forward position.

2. A latch fastener for drawing two bodies together and for securing them in rigid relationship against shear and tension loads, said fastener comprising two assembly units, one secured to each of said bodies, each assembly unit including a frame, a draw bolt pivotally mounted in one frame and constituting a bail-type hook with a loop at its outer end, the frames having aligned slots on their upper faces to receive the central portion of the bolt when the fastener is locked, a shear pin assembly slidably mounted in the second frame and comprising a bolt having a transverse detent to receive the loop and having a forward threaded extension, a shear pin having a rear threaded opening to receive the extension to provide longitudinal adjustability of the assembly upon rotation of one of said elements, and means for restraining rotation of said one element, a draw bolt lever pivoted at one end in the first frame, the draw bolt pivot connecting the draw bolt with the lever intermediate its ends, said lever being movable to a below center position with a toggle action to lock the fastener with the shear pin in forward position.

3. A latch fastener for drawing two bodies together and for securing them in rigid relationship against shear and tension loads, said fastener comprising two assembly units, one secured to each of said bodies, each assembly unit including a frame, a draw bolt pivotally mounted in one frame and constituting a bail-type hook with a loop at its outer end and provided with an upwardly offset portion between the pivot and the loop, a shear pin assembly slidably mounted in the second frame and comprising a bolt having a transverse detent to receive the loop and having a forward threaded extension, a shear pin having a rear threaded opening to receive the extension and wherein one of the elements can be rotated relative to the other to provide longitudinal adjustability of the assembly, a draw bolt lever pivoted at one end in the first frame, the draw bolt pivot connecting the draw bolt with the lever intermediate its ends, said lever being movable to a below center position with a toggle action to lock the fastener with the shear pin in forward position.

4. A latch fastener for drawing two bodies together and for securing them in rigid relationship against shear tension loads, said fastener comprising two assembly units, one secured to each of said bodies, each assembly unit including a frame, a draw bolt pivotally mounted in one frame and constituting a bail-type hook with a loop at its outer end, the frames having aligned slots on their upper faces to receive the central portion of the bolt when the fastener is locked, a shear pin assembly slidably mounted in the second frame and comprising a bolt having a detent to receive the loop and having a forward threaded extension, a shear pin having a rear threaded opening to receive the extension to provide longitudinal adjustability of the assembly upon rotation of the bolt, and means for restraining rotation of the shear pin comprising a non-circular flange carried thereby and a spring restraining rotation of the flange, a draw bolt lever pivoted at one end in the first frame, the draw bolt pivot connecting the draw bolt with the lever intermediate its ends, said lever being movable to a below center position with a toggle action to lock the fastener with the shear pin in forward position.

5. A latch fastener for drawing two bodies together and for securing them in rigid relationship against shear and tension loads, said fastener comprising two assembly units, one secured to each of said bodies, each assembly unit including a frame, a draw bolt pivotally mounted in one frame and constituting a bail-type hook with a loop at its outer end, a shear pin assembly slidably mounted in the second frame and comprising a bolt having a detent to receive the loop, a shear pin having a threaded connection with the bolt to provide longitudinal adjustability of the assembly, a draw bolt lever pivoted at one end in the first frame, the draw bolt pivot connecting the draw bolt with the lever intermediate its ends, said lever being movable to a below center position with a toggle action to lock the fastener with the shear pin in forward position, a hand lever pivoted at the outer end of the draw bolt lever, and a pin movable in aligned slots in the two levers to lock them together for conjoint movement, and means for ejecting the pin from the slots.

6. A latch fastener for drawing two bodies together and for securing them in rigid relationship against shear and tension loads, said fastener comprising two assembly units, one secured to each of said bodies, each assembly unit including a frame, a draw bolt pivotally mounted in one frame and constituting a bail-type hook with a loop at its outer end and provided with an upwardly offset portion between the pivot and the loop, the frames having aligned slots on their upper faces to receive said offset portion when the fastener is locked, a shear pin assembly slidably mounted in the second frame and comprising a block having a detent to receive the loop and having a forward threaded extension, a shear pin having a rear threaded opening to receive the extension to provide longitudinal adjustability of the assembly, the forward faces of the frames forming shear elements, a draw bolt lever pivoted at one end in the first frame, the draw bolt pivot connecting the draw bolt with the lever intermediate its ends, said lever being movable to a below center position with a toggle action to lock the fastener with the shear pin in forward position, a hand lever pivoted at the outer end of the draw bolt lever, and means for locking the two levers together for conjoint movement, the two levers having alignable openings therein, a pin in the slot in one of the levers, a pivoted trigger for moving the pin into both slots when they become aligned, said trigger having a cam for moving the pin out of the slot in the second lever.

7. A latch fastener for drawing two bodies together and for securing them in rigid relationship against shear and tension loads, said fastener comprising two assembly units, one secured to each of said bodies, each assembly unit including a frame, a draw bolt pivotally mounted in one frame and constituting a bail-type hook with a loop at its outer end, the frames having aligned slots on their upper faces to receive the central portion of the bolt when the fastener is locked, a longitudinally adjustable shear pin assembly slidably mounted in the second frame and comprising a shear pin, a bolt having a detent to receive the loop, the bolt having an elongated transverse slot adjacent the rear end thereof, a guide carried by the second frame passing through said slot, a draw bolt lever pivoted at one end in the first frame, the draw bolt pivot connecting the draw bolt with the lever intermediate its ends, said lever being movable to a below center position with a toggle action to lock the fastener with the shear pin in forward position.

8. A latch fastener for drawing two bodies together and for securing them in rigid relationshp against shear and tension loads, said fastener comprising two assembly units, one secured to each of said bodies, each assembly unit including a frame, a draw bolt pivotally mounted in one frame and constituting a bail-type hook with a loop at its outer end and provided with a central portion between the pivot and the loop, the frames having aligned slots on their upper faces to receive said central portion when the fastener is locked, a shear pin assembly slidably mounted in the second frame and comprising a bolt having a detent to receive the loop and having a forward threaded extension, a shear pin having a rear threaded opening to receive the extension to provide longitudinal adjustability of the assembly upon rotation of the shear pin, the shear pin having a non-circular flange secured thereto and a spring for restraining rotation of the flange, a draw bolt lever pivoted at one end in the first frame, the draw bolt pivot connecting the draw bolt with the lever intermediate its ends, said lever being movable to a below center position with a toggle action to lock the fastener with the shear pin in forward position.

9. A latch fastener for drawing two bodies together and for securing them in rigid relationship against shear and tension loads, said fastener comprising two assembly units, one secured to each of said bodies, each assembly unit including a frame, a draw bolt pivotally mounted in one frame and constituting a bail-type hook with a loop at its outer end and provided with an upwardly offset portion between the pivot and the loop, a longitudinally adjustable shear pin assembly supported at each end thereof for sliding movement in the second frame and comprising a bolt having a detent to receive the loop and a shear pin carried by the bolt, the forward face of the second frame having a shear pin opening for supporting the forward end of the shear pin, and a pin and slot for supporting the rear end of the shear pin, a draw bolt lever pivoted at one end in the first frame, the draw bolt pivot connecting the draw bolt with the lever intermediate its ends, said lever being movable to a below center position with a toggle action to lock the fastener with the shear pin in forward position.

10. A latch fastener for drawing two bodies together and for securing them in rigid relationship against shear and tension loads, said fastener comprising two assembly units, one secured to each of said bodies, each assembly unit including a frame, a draw bolt pivotally mounted in one frame and constituting a bail-type hook with a loop at its outer end and provided with an upwardly offset portion between the pivot and the loop, the frames having aligned slots on their upper faces to receive said offset portion when the fastener is locked, a shear pin assembly including a shear pin slidably mounted in the second frame and having a detent to receive the loop, a draw bolt lever pivoted at one end in the first frame, the draw bolt pivot connecting the draw bolt with the lever intermediate its ends, said lever being movable to a below center position with a toggle action to lock the fastener with the shear pin in forward position, said lever carrying a pivoted bell-crank lever formed with a hook for engagement with the frame and also a socket to receive a manipulating tool arranged to release the hook.

11. A latch fastener for drawing two bodies together and for securing them in rigid relationship against shear and tension loads, said fastener comprising two assembly units, one secured to each of said bodies, each assembly unit including a frame, a draw bolt pivotally mounted in one frame and constituting a bail-type hook with a loop at its outer end and provided with an upwardly offset portion between the pivot and the loop, the frames having aligned slots on their upper faces to receive said offset portion when the fastener is locked, a shear pin assembly slidably mounted in the second frame and comprising a bolt having a detent to receive the loop, a shear pin having a threaded connection with the bolt, the bolt further having a rear elongated transverse opening, and a fixed pin carried by the second frame passing through said elongated slot to guide the block in its movement, a draw bolt lever pivoted at one end in the first frame, the draw bolt pivot connecting the draw bolt with the lever intermediate its ends, said lever being movable to a below center position with a toggle action to lock the fastener with the shear pin in forward position, a second lever pivoted on the draw bolt lever and having a hook portion, a pin carried by the first frame which is engaged by the hook portion when the fastener is locked, and a tailpiece carried by the second lever for moving the same to disengage the hook portion from the pin.

References Cited in the file of this patent

UNITED STATES PATENTS

| 2,695,803 | Summers | Nov. 30, 1954 |

FOREIGN PATENTS

| 633,301 | Great Britain | Dec. 12, 1949 |
| 676,005 | Germany | Mar. 24, 1939 |